US012735592B2

(12) United States Patent
Sanpei et al.

(10) Patent No.: US 12,735,592 B2
(45) Date of Patent: Sep. 15, 2026

(54) INKJET INK FOR TABLET AND TABLET PRINTED MATTER

(71) Applicant: TOPPAN Holdings Inc., Tokyo (JP)

(72) Inventors: Misa Sanpei, Tokyo (JP); Yuichi Hoshino, Tokyo (JP); Seiya Koseki, Tokyo (JP); Risa Hashimoto, Tokyo (JP); Yasuhisa Miyazawa, Tokyo (JP); Takumi Tanioka, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 19/187,906

(22) Filed: Apr. 23, 2025

(65) Prior Publication Data

US 2025/0333616 A1 Oct. 30, 2025

(30) Foreign Application Priority Data

Apr. 24, 2024 (JP) ................................ 2024-070461

(51) Int. Cl.

| | |
|---|---|
| ***B32B 3/10*** | (2006.01) |
| ***C09D 11/033*** | (2014.01) |
| ***C09D 11/037*** | (2014.01) |
| ***C09D 11/328*** | (2014.01) |
| ***C09D 11/38*** | (2014.01) |

(52) U.S. Cl.

CPC .......... *C09D 11/328* (2013.01); *C09D 11/033* (2013.01); *C09D 11/037* (2013.01); *C09D 11/38* (2013.01)

(58) Field of Classification Search

None

See application file for complete search history.

(56) References Cited

U.S. PATENT DOCUMENTS

| | | | |
|---|---|---|---|
| 2021/0009835 | A1 | 1/2021 | Ishikawa et al. |
| 2021/0380828 | A1 | 12/2021 | Hoshino et al. |
| 2025/0017863 | A1 | 1/2025 | Koseki et al. |

FOREIGN PATENT DOCUMENTS

| | | | | |
|---|---|---|---|---|
| EP | 3778800 | A1 * | 2/2021 | ........... C09D 11/328 |
| EP | 4541863 | A1 | 4/2025 | |
| JP | 3193228 | U | 9/2014 | |
| JP | 6389506 | B2 | 9/2018 | |
| JP | 2020-183486 | A | 11/2020 | |
| JP | 6888728 | B1 * | 6/2021 | .............. B41J 3/407 |
| JP | 2022-087121 | A | 6/2022 | |
| JP | 2023-150596 | A | 10/2023 | |
| JP | 7464186 | B1 | 4/2024 | |
| JP | 7708266 | B1 | 7/2025 | |

OTHER PUBLICATIONS

Machine translation of JP-6888728-B1 (Year: 2021).*

* cited by examiner

*Primary Examiner* — Christopher M Polley

(74) *Attorney, Agent, or Firm* — XSENSUS LLP

(57) ABSTRACT

An object of the present invention is to provide an inkjet ink in which fixedness (transfer durability) of the ink is improved while maintaining excellent printing stability, and a tablet printed matter including a printing portion printed with the inkjet ink. The inkjet ink according to the present embodiment includes an edible dye, an adhesive, and water and ethanol as a solvent, and only a liquid adhesive as the adhesive.

16 Claims, 2 Drawing Sheets

INKJET INK FOR TABLET AND TABLET PRINTED MATTER

CROSS-REFERENCE TO RELATED APPLICATION

The present application claims the benefit of priority to Japanese patent application no. JP 2024-070461, filed Apr. 24, 2024, the entire content of which is incorporated herein by reference.

TECHNICAL FIELD

The present invention relates to an inkjet ink for a tablet and a tablet printed matter.

BACKGROUND ART

An inkjet printing ink for printing on a tablet (hereinafter, also simply referred to as an "inkjet ink") has, for example, edibility by using a food dye such as a tar-based pigment as a colorant (for example, see PTL 1).

In mass production of tablets including a printing portion printed with the inkjet ink (text printing ink) described above, a phenomenon in which the text printing ink of one tablet is transferred to another tablet may occur due to the contact between the tablets after printing.

This may cause an external defect in the tablet, which may lead to an increase in defective tablets and a decrease in productivity.

To suppress the unintended transfer of the text printing ink, an inkjet ink having high ink drying properties and high ink fixedness is required. Meanwhile, in a case where the amount of drying solvent in the ink is increased, drying of a nozzle liquid surface is promoted, and printing stability may deteriorate.

In addition, to solve the problem of the fixedness of the ink, there is a method of using a solid or gel-type adhesive, but in a case where these adhesives are added, printing quality such as intermittent resumability may deteriorate.

CITATION LIST

Patent Literature

PTL 1: JP 6389506 B

SUMMARY OF INVENTION

Technical Problem

As described above, there are few inkjet inks for tablets in the related art, which have excellent fixedness (transfer durability) of the ink while maintaining excellent printing stability. Specifically, the inkjet inks for tablets in the related art have few inks that are excellent in all of initial printability, continuous printability, intermittent resumability, and transfer durability.

The present inventor has found that it is necessary to add a liquid adhesive to the inkjet ink for the performance improvement of the inkjet ink described above.

The present invention has been made in view of such points, and an object of the present invention is to provide an inkjet ink in which fixedness (transfer durability) of the ink is improved while maintaining excellent printing stability, and a tablet printed matter including a printing portion printed with the inkjet ink.

Solution to Problem

To achieve the object described above, an inkjet ink according to an aspect of the present invention includes an edible dye, an adhesive, and water and ethanol as a solvent, and includes only a liquid adhesive as the adhesive.

In addition, to achieve the object described above, a tablet printed matter according to another aspect of the present invention includes a printing portion printed by using the inkjet ink described above.

Advantageous Effects of Invention

According to an aspect of the present invention, it is possible to improve fixedness (transfer durability) of an ink while maintaining excellent printing stability.

DESCRIPTION OF EMBODIMENTS

Figure 1:
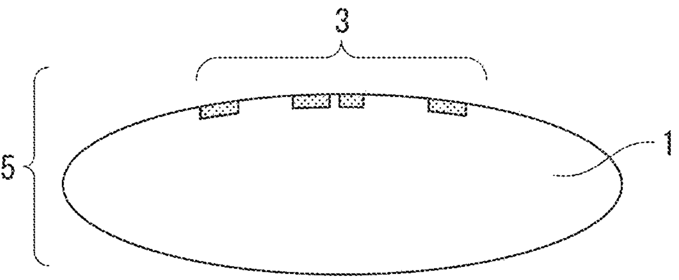
FIG. 1 is a schematic cross-sectional view illustrating an example of a tablet (uncoated tablet) according to an embodiment of the present invention.

An inkjet ink according to an embodiment of the present invention (hereinafter, referred to as "present embodiment") relates to an inkjet ink capable of improving ink fixedness (transfer durability) while maintaining printing stability of a printing image or the like obtained with an inkjet printing method on a surface of a medical tablet, for example. Hereinafter, a configuration of the inkjet ink (inkjet ink for a tablet) according to the embodiment of the present invention and a tablet (tablet printed matter) including a printing portion printed with the inkjet ink will be described in detail.

[Configuration of Inkjet Ink]

The inkjet ink according to the present embodiment is an inkjet ink having edibility, and includes at least a food dye (food pigment), an adhesive, and water and ethanol as a solvent.

In addition, the inkjet ink according to the present embodiment includes only a liquid adhesive as the adhesive described above for fixing the ink to a surface of a target printed matter (for example, solid preparation). Specifically, in the present embodiment, only an adhesive (hereinafter, also referred to as a "liquid adhesive" for convenience) having a viscosity of 1,000 mPa·s or less at a temperature range of the adhesive of 0° C. or more and 50° C. or less is used. In addition, the "adhesive" in the present embodiment may also be referred to as a coating agent.

In addition, the inkjet ink according to the present embodiment includes, for example, polyethylene glycol as the liquid adhesive.

In addition, the inkjet ink according to the present embodiment includes, for example, polyethylene glycol having an average molecular weight in a range of 280 or more and 420 or less as the liquid adhesive.

In addition, the inkjet ink according to the present embodiment further includes propylene glycol as a wetting agent, for example.

Further, in the inkjet ink according to the present embodiment, for example, a dye is compounded in a range of 1.0% or more and 5.0% or less with respect to a total mass of the inkjet ink for a tablet, an adhesive is compounded in a range of 1.0% or more and 7.0% or less with respect to the total mass of the inkjet ink for a tablet, and a wetting agent is compounded in a range of more than 0% and 28.0% or less with respect to the total mass of the inkjet ink for a tablet.

In addition, in the inkjet ink according to the present embodiment, for example, the wetting agent is not compounded, the dye is compounded in a range of 1.0% or more and 5.0% or less with respect to the total mass of the inkjet ink for a tablet, and the adhesive is compounded in a range of 1.0% or more and 7.0% or less with respect to the total mass of the inkjet ink for a tablet.

In addition, the dye of the inkjet ink according to the present embodiment is, for example, at least one selected from an azo-based dye, a triphenylmethane-based dye, or a xanthene-based dye.

In addition, in the inkjet ink according to the present embodiment, for example, Red No. 102 or Yellow No. 4 is added as an azo-based dye, Blue No. 1 is added as a triphenylmethane-based dye, and Red No. 3 is added as a xanthene-based dye.

Hereinafter, each component constituting the inkjet ink according to the present embodiment will be described.

(Colorant)

As described above, the inkjet ink according to the present embodiment includes a food dye. The food dye used in the present embodiment is, for example, at least one selected from an azo-based dye, a triphenylmethane-based dye, or a xanthene-based dye.

In addition, as the azo-based dye, for example, Red No. 102 or Yellow No. 4 is used.

In addition, as the triphenylmethane-based dye, for example, Blue No. 1 is used.

In addition, as the xanthene-based dye, for example, Red No. 3 is used.

In the inkjet ink according to the present embodiment, a compounding ratio of the food dye, that is, a total content of the food dyes is preferably in a range of 1.0 mass % or more and 5.0 mass % or less, more preferably in a range of 1.0 mass % or more and 4.0 mass % or less, and still more preferably in a range of 1.5 mass % or more and 3.0 mass % or less with respect to the total mass of the ink.

With such a configuration, it is possible to impart appropriate visibility to a printing image and to impart high printing stability. In the present embodiment, the "printing stability" is a concept including initial printability, continuous printability, and intermittent resumability (printing resumability).

On the other hand, when the total content of the food dyes described above is less than 1.0 mass %, the entire print color tends to be light, and the visibility of the printing image is reduced. In addition, in a case where the total content of the food dyes described above exceeds 5.0 mass %, dissolution stability of the food dye deteriorates, and thus the pigment in the ink is precipitated or deposited as a solid, which causes nozzle clogging of an inkjet head during printing, and printing stability, particularly, intermittent resumability may deteriorate.

The inkjet ink according to the present embodiment may include a pigment (colorant) other than the food dye described above. The pigment other than the food dye described above is not particularly limited as long as the pigment has edibility.

The pigment capable of being added to the inkjet ink according to the present embodiment is able to be appropriately selected and added from, for example, a known synthetic food pigment or a known natural food pigment in the related art.

In addition, even in a case where the inkjet ink according to the present embodiment includes a colorant other than the food dye described above as a food dye, the total content of the food dye is preferably in a range of 1.0 mass % or more and 5.0 mass % or less, more preferably in a range of 1.0 mass % or more and 4.0 mass % or less, and still more preferably in a range of 1.5 mass % or more and 3.0 mass % or less. Therefore, it is possible to impart appropriate visibility to the printing image and impart excellent printing stability, particularly excellent intermittent resumability, to the inkjet ink.

Examples of the synthetic food pigment include a tar-based pigment, a natural pigment derivative, a natural synthetic pigment, and the like. Examples of the tar-based pigment include Food Red No. 2, Food Red No. 3, Food Red No. 40, Food Red No. 102, Food Red No. 104, Food Red No. 105, Food Red No. 106, Food Yellow No. 4, Food Yellow No. 5, Food Blue No. 2, Food Red No. 2 Aluminum Lake, Food Red No. 3 Aluminum Lake, Food Red No. 40 Aluminum Lake, Food Yellow No. 4 Aluminum Lake, Food Yellow No. 5 Aluminum Lake, Food Blue No. 1 Aluminum Lake, Food Blue No. 2 Aluminum Lake, and the like. Examples of the natural pigment derivative include norbixin potassium and the like. Examples of the natural synthetic pigment include β-carotene, riboflavin, and the like.

In addition, examples of the natural food pigment include an anthocyanin-based pigment, a carotenoid-based pigment, a quinone-based pigment, a chlorophyll-based pigment, a flavonoid-based pigment, a betaine-based pigment, a monascus pigment, and other pigments derived from natural products. Examples of the anthocyanin-based pigment include a red radish pigment, a red cabbage pigment, a red rice pigment, an elderberry pigment, a cowberry pigment, a gooseberry pigment, a cranberry pigment, a salmonberry pigment, a shiso pigment, a swim blueberry pigment, a strawberry pigment, a dark sweet cherry pigment, a cherry pigment, a hibiscus pigment, a huckleberry pigment, a grape juice pigment, a grape skin pigment, a black currant pigment, a blackberry pigment, a blueberry pigment, a plum pigment, a whortleberry pigment, a boysenberry pigment, a mulberry pigment, a purple yam pigment, a purple corn pigment, a purple mountain yam pigment, a raspberry pigment, a red currant pigment, a loganberry pigment, and other anthocyanin-based pigments. Examples of the carotenoid-based pigment include an annatto pigment, a gardenia yellow pigment, and other carotenoid-based pigments. Examples of the quinone-based pigment include a cochineal pigment, a shikonin pigment, a lac pigment, and other quinone-based pigments. Examples of the flavonoid-based pigment include safflower yellow, sorghum pigment, onion pigment, and other flavonoid-based pigments. Examples of the betaine-based pigment include a beet red pigment. Examples of the monascus pigment include a monascus red pigment and a monascus yellow pigment. Examples of the pigment derived from other natural products include a turmeric pigment, a kusagi pigment, a gardenia red pigment, a spirulina blue pigment, and the like.

(Adhesive)

As described above, the inkjet ink according to the present embodiment includes only a liquid adhesive as an adhesive for fixing a food dye to a surface of a target printed matter. Specifically, the adhesive included in the inkjet ink according to the present embodiment is, for example, polyethylene glycol (PEG). In addition, as the adhesive in the present embodiment, among polyethylene glycols, polyethylene glycol having an average molecular weight in a range of 280 or more and 420 or less is preferable, and polyethylene glycol having an average molecular weight in a range of 300 or more and 400 or less is more preferable.

In a case where the adhesive has the configuration described above, by adding the adhesive to the inkjet ink together with the solvent (water and ethanol) described above, the inkjet ink is imparted with an appropriate viscosity (fluidity), and affinity (bonding property) with a tablet surface substance is increased, and thus the ink including the food dye described above is able to be fixed to the surface of the target printed matter. Therefore, the inkjet ink according to the present embodiment is able to improve visibility of a printing image, and is able to improve ink fixedness (transfer durability) of the printing image.

In a case where an average molecular weight of polyethylene glycol is less than 280, the fluidity of the inkjet ink is too high, and thus the affinity (bonding property) with the tablet surface substance may not be sufficiently obtained. In addition, in a case where the average molecular weight of polyethylene glycol is more than 420, the fluidity of the inkjet ink is too low, and thus the affinity (bonding property) with the tablet surface substance may not be sufficiently obtained.

In addition, in the inkjet ink according to the present embodiment, two or more types of adhesives having different average molecular weights may be used in combination as an adhesive. In the inkjet ink according to the present embodiment, for example, polyethylene glycol (PEG 400) having an average molecular weight in a range of 380 or more and 420 or less and polyethylene glycol (PEG 300) having an average molecular weight in a range of 285 or more and 315 or less may be used in combination as the adhesive. In polyethylene glycols having different average molecular weights, types of solvents in which polyethylene glycols are easily dissolved are different from each other. That is, in the inkjet ink according to the present embodiment, in a case where two or more types of polyethylene glycols having different average molecular weights are used, solubility in water and solubility in ethanol, which are used as a solvent, are different from each other. Therefore, in the present embodiment, by using two or more types of polyethylene glycols having different average molecular weights in combination as the adhesive, the maximum amount of dissolution (total amount of dissolution) in a solvent including water and ethanol is able to be increased, as compared with a case where only one type of polyethylene glycol is used as the adhesive. As a result, with the configuration described above, the inkjet ink is imparted with an appropriate viscosity (fluidity), and the affinity (bonding property) with the tablet surface substance is increased, and thus the ink including the food dye described above is able to be fixed to the surface of the target printed matter. Therefore, the inkjet ink according to the present embodiment is able to improve visibility of a printing image, and is able to improve ink fixedness (transfer durability) of the printing image.

In the inkjet ink according to the present embodiment, a compounding ratio of the adhesive is preferably in a range of 1.0 mass % or more and 7.0 mass % or less, more preferably in a range of 1.0 mass % or more and 4.2 mass % or less, and still more preferably in a range of 2.8 mass % or more and 4.2 mass % or less, with respect to a total mass of the ink.

With such a configuration, the fixing effect of the ink by the adhesive described above is more reliably exhibited, and ink fixedness (transfer durability) of the inkjet ink is able to be reliably improved. In addition, an appropriate viscosity (fluidity) is imparted to the inkjet ink, and thus the inkjet ink according to the present embodiment is able to be imparted with high printing stability, particularly intermittent resumability.

On the other hand, in a case where the compounding ratio of the adhesive is less than 1.0 mass %, the fixing effect of the ink is reduced, and the ink fixedness (transfer durability) may be difficult to obtain. In addition, in a case where the compounding ratio of the adhesive is more than 7.0 mass %, the viscosity of the ink increases, and dissolution stability of the adhesive deteriorates, which causes nozzle clogging of an inkjet head during printing, and printing stability, particularly intermittent resumability may deteriorate.

In addition, in a case where the adhesive includes two or more types of adhesives having different average molecular weights, and the compounding ratio of the entire adhesive is less than 1.0 mass %, the fixing effect of the ink may be reduced, and the ink fixedness (transfer durability) may be difficult to obtain. In addition, in a case where the compounding ratio of the entire adhesive exceeds 7.0 mass %, the viscosity of the ink increases, and the dissolution stability of the adhesive deteriorates, which causes nozzle clogging of the inkjet head during printing, and printing stability, particularly intermittent resumability may deteriorate.

In the inkjet ink according to the present embodiment, in a case where two or more types of adhesives having different average molecular weights are included as the adhesive, the compounding ratio of the adhesive may be 1.0 mass % or more in total.

In addition, in a case where the adhesive includes two or more types of adhesives having different average molecular weights, a compounding ratio of the adhesive having a low average molecular weight may be more than a compounding ratio of the adhesive having a high average molecular weight. For example, the compounding ratio of the adhesive having a low average molecular weight is preferably in a range of 1.1 times or more and 2.0 times or less, more preferably in a range of 1.1 times or more and 1.5 times or less, and still more preferably in a range of 1.1 times or more and 1.3 times or less, with respect to the compounding ratio of the adhesive having a high average molecular weight.

In addition, in a case where the adhesive includes two or more types of adhesives having different average molecular weights, the compounding ratio of the adhesive having a high average molecular weight may be more than the compounding ratio of the adhesive having a low average molecular weight. For example, the compounding ratio of the adhesive having a high average molecular weight is preferably in a range of 1.1 times or more and 2.0 times or less, more preferably in a range of 1.1 times or more and 1.5 times or less, and still more preferably in a range of 1.1 times or more and 1.3 times or less, with respect to the compounding ratio of the adhesive having a low average molecular weight.

With such a configuration, the fixing effect of the ink by the adhesive described above is more reliably exhibited, and fixedness (transfer durability) of the inkjet ink is able to be reliably improved.

(Solvent)

The inkjet ink according to the present embodiment contains a solvent (dispersion medium), in addition to the food dye described above and the adhesive described above, the solvent (dispersion medium) being for dissolving (dispersing) the food dye and the adhesive. The inkjet ink according to the present embodiment may include water (for example, purified water) and ethanol as a solvent.

In addition, the inkjet ink according to the present embodiment may further include propylene glycol (PG) as a solvent. Propylene glycol functions as a wetting agent, and is able to impart high printing stability and particularly excellent intermittent resumability to the ink by preventing the ink from being dried in an inkjet nozzle. In addition, since ethanol has high volatility, transfer durability (drying properties) of the inkjet ink is able to be improved.

In addition, the compounding ratio of each component of the solvent described above in the inkjet ink according to the present embodiment is not limited, but the compounding ratio of ethanol, that is, the addition amount of ethanol is preferably in a range of 6.5 mass % or more and 11.5 mass % or less, with respect to a total mass of the ink. With such a configuration, drying properties of the inkjet ink are reliably improved. Therefore, it is possible to impart excellent transfer durability to the inkjet ink.

On the other hand, in a case where the addition amount of ethanol is less than 6.5 mass %, a delay of drying of a text printing surface on a tablet surface is increased, and there is a possibility that a defect (transfer failure) such as adhesion of the undried ink to another tablet and contamination occurs when the printed tablets come into contact with each other. On the other hand, in a case where the addition amount of ethanol is more than 11.5 mass %, the ink is dried in the inkjet nozzle, which causes nozzle clogging of the inkjet head during printing, and printing stability, particularly intermittent resumability, may deteriorate.

In addition, in the inkjet ink according to the present embodiment, in a case where the solvent includes propylene glycol, the compounding ratio of propylene glycol, that is, the addition amount of propylene glycol is preferably in a range of 0 mass % or more and 28.0 mass % or less, with respect to a total mass of the ink. With such a configuration, the inkjet ink is imparted with appropriate viscosity (fluidity), the drying of the ink in the inkjet nozzle is prevented, and high printing stability, particularly excellent intermittent resumability is able to be imparted to the ink.

In addition, the addition amount of propylene glycol is more preferably 10 mass % or more. Therefore, the inkjet ink is imparted with an appropriate viscosity (fluidity), and the drying of the ink in the inkjet nozzle is further prevented, and high printing stability, particularly excellent intermittent resumability is able to be further imparted to the ink.

When the addition amount of propylene glycol exceeds 28.0 mass %, a delay of drying of the text printing surface on the tablet surface is increased, and there is a possibility that a defect (transfer failure) such as adhesion of the undried ink to the other tablet and contamination occurs in a case where the printed tablets come into contact with each other.

In addition, the inkjet ink according to the present embodiment may further include at least one of glycerin or isopropyl alcohol as a solvent. Specifically, the solvent described above may further include any one of glycerin or isopropyl alcohol, or may further include both glycerin and isopropyl alcohol. Glycerin functions as a wetting agent in the same manner as propylene glycol described above. In addition, since isopropyl alcohol has high volatility in a same manner as ethanol described above, the transfer durability (drying properties) of the inkjet ink is able to be improved. In a case where glycerin and isopropyl alcohol are further added to the solvent in addition to the components described above, light durability of the inkjet ink is able to be improved, and the performance corresponding to each component is able to be imparted to the inkjet ink. In addition, by further including these components in the solvent, the inkjet ink is imparted with an appropriate viscosity (fluidity), and the affinity (bonding property) with the tablet surface substance is further increased, so that the fixing effect of the ink including the food dye described above is able to be further improved.

(Internal-Sizing Resin)

The inkjet ink according to the present embodiment may contain an internal-sizing resin, in addition to the pigment or the solvent described above. The internal-sizing resin capable of being added to the inkjet ink according to the present embodiment is not particularly limited as long as the internal-sizing resin has edibility, and is a water-soluble powder, a paste, or a flake-type resin-type substance, and it is sufficient that the resin-type substance is a substance capable of forming a coating film on a surface of a tablet by drying after text printing. Examples of the internal-sizing resin described above include polyvinyl alcohol (PVA), hydroxypropyl cellulose (HPC), hydroxypropyl methyl cellulose (HPMC), polyvinylpyrrolidone (PVP), high-molecular-weight polyethylene glycol (PEG) such as polyethylene glycol 4000/polyethylene glycol 1540, a shellac resin, a methacrylic acid copolymer (product name: EUDRAGIT S100), maltodextrin, erythritol, and the like.

(Leveling Agent)

The inkjet ink according to the present embodiment may contain a leveling agent, in addition to the pigment, the solvent, or the internal-sizing resin described above. The leveling agent able to be added to the inkjet ink according to the present embodiment may be any water-soluble surfactant having edibility. Examples of the leveling agent described above include polyglycerin fatty acid ester (for example, distearic acid decaglycerin Q-182S manufactured by Taiyo Chemical Co., Ltd. and monolauric acid decaglycerin Q-12S manufactured by Taiyo Chemical Co., Ltd.), sorbitan fatty acid ester (for example, NIKKOL SL-10 manufactured by NIKKO CHEMICAL CO., LTD.), sucrose fatty acid ester (for example, DK ester F-110 manufactured by DKS Co., Ltd.), polysorbate (EMASOL S-120 series manufactured by Kao Corporation), and the like.

(Fading Inhibitor)

The inkjet ink according to the present embodiment may contain a fading inhibitor, in addition to the pigment or the solvent, or the internal-sizing resin or the leveling agent described above. The fading inhibitor able to be added to the inkjet ink according to the present embodiment may be any substance having edibility. Examples of the fading inhibitor described above include reduced isomaltulose, tripotassium citrate, and the like.

When the fading inhibitor described above is added to the inkjet ink, the inkjet ink is able to be imparted with excellent light durability.

[Printing Method]

The inkjet ink according to the present embodiment is not particularly limited in terms of the printing method, and printing is able to be performed by using an inkjet apparatus such as a commercially available inkjet printer. Therefore, the inkjet ink according to the present embodiment has a wide application range, and is greatly useful. For example, printing is able to be performed with the inkjet ink according to the present embodiment in a so-called drop-on-demand type inkjet apparatus using a piezoelectric element (piezoelectric ceramic) as an actuator, and printing is able to be performed with the inkjet ink in another type of inkjet apparatus.

Examples of the inkjet apparatus of a drop-on-demand type include an apparatus adopting a thermal inkjet method in which an inkjet ink is discharged by a vapor pressure generated by instantaneously heating a micro heat generating element to a high temperature (200° C. to 300° C.), an electrostatic type apparatus in which an inkjet ink is discharged by causing an actuator to vibrate electrostatically, an apparatus adopting an ultrasonic method using a cavitation phenomenon of ultrasonic waves, and the like. In addition, in a case where the inkjet ink according to the present embodiment has chargeability, it is also possible to use an apparatus adopting a continuous ejection method (continuous method).

[Tablet]

In the present embodiment, the inkjet ink according to the present embodiment may be used for performing text printing and image printing on, for example, a surface of a tablet, by using the printing method described above. That is, the tablet according to the present embodiment may have a printing portion, that is, a printing image printed by using the inkjet ink according to the present embodiment. With the inkjet ink according to the present embodiment, for example, light durability of a printing image (for example, the printing image 3) printed on a surface of a medical tablet by using an inkjet printing method is able to be improved. Hereinafter, a configuration of the tablet including the printing image printed with the inkjet ink according to the embodiment will be described.

The tablet according to the present embodiment is, for example, a medical tablet. Here, the "medical tablet" includes, for example, a film-coated tablet or the like in which a water-soluble surface layer is formed on the outermost surface of the tablet, in addition to an uncoated tablet (plain tablet), a sugar-coated tablet, an enteric tablet, an orally disintegrating tablet, and the like.

FIG. 1 is a schematic cross-sectional view illustrating an example of a medical tablet (uncoated tablet) on which printing (text printing and image printing) is performed. FIG. 1 illustrates an uncoated tablet printed matter 5 in which a printing image 3 such as a text is printed on an upper surface of a tablet base material 1, in a cross-sectional view.

Figure 2:
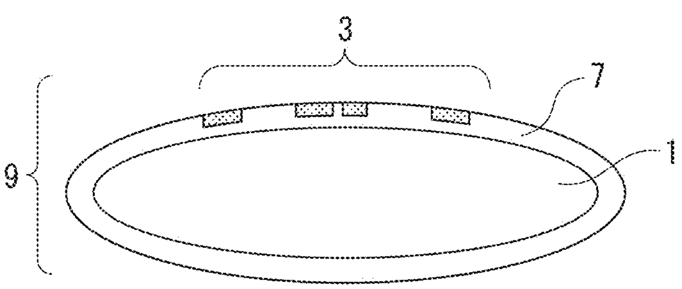
FIG. 2 is a schematic cross-sectional view illustrating an example of a tablet (film-coated tablet) according to the embodiment of the present invention.

FIG. 2 is a schematic cross-sectional view illustrating an example of a medical tablet (film-coated tablet) on which printing (text printing and image printing) is performed. FIG. 2 illustrates a film-coated tablet printed matter 9 in which the printing image 3 such as a text is printed on an upper surface of the tablet base material 1 in which a film coating layer 7 is formed on the surface, in a cross-sectional view.

Figure 3:
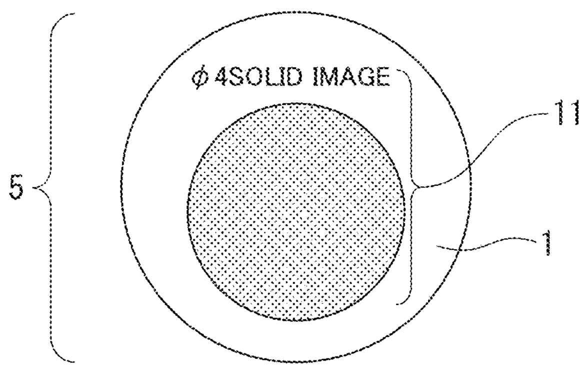
FIG. 3 is an example of a printing image of the tablet (uncoated tablet) according to the embodiment of the present invention.
Figure 4:
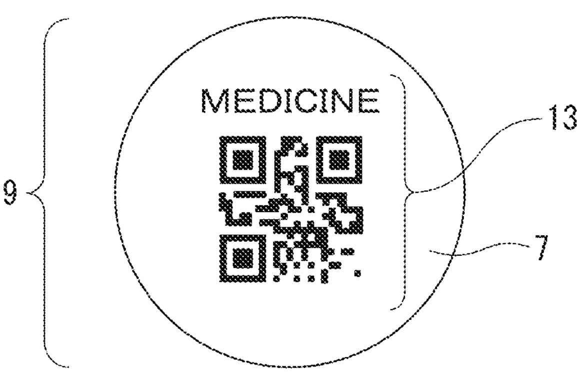
FIG. 4 is an example of a printing image of the tablet (film-coated tablet) according to the embodiment of the present invention.

In the present embodiment, as illustrated in FIG. 3, a solid image may be printed as an uncoated tablet printing image 11, and as illustrated in FIG. 4, a two-dimensional barcode may be printed as a film-coated tablet printing image 13.

An active component contained in the medical tablet is not particularly limited. For example, substances effective for prevention and treatment of various diseases (for example, substances having a sleep-inducing effect, a tranquilizer activity, an antibacterial activity, an antihypertensive effect, an antiaging activity, an analgesic effect, an anti-inflammatory activity, a mental stabilizing effect, an antidiabetic activity, a diuretic effect, an anticholinergic activity, an antacid excess action, an antiepileptic action, an ACE inhibitory activity, a β-receptor antagonist or agonist activity, an anesthetic effect, an appetite suppressing effect, an antiarrhythmic effect, an antidepressant effect, an antithrombotic activity, an antidiarrheal effect, an antihistamine activity, an antimalarial effect, an antitumor activity, an immunosuppressive activity, an anti-Parkinson's disease effect, an antipsychotic effect, an antiplatelet activity, and the like), a substance having a washing effect, a fragrance, a substance having a deodorizing effect, and the like without being limited thereto.

The tablet according to the present embodiment is able to be compounded with a carrier that is allowed for use together with the active component, as necessary. For example, in the medical tablet, a pharmaceutically acceptable carrier is able to be compounded. As the pharmaceutically acceptable carrier, various organic or inorganic carrier substances commonly used as a formulation material are used, and for example, an appropriate amount of an excipient, a lubricant, a binder, a disintegrant, a thickener, or the like is appropriately compounded. In addition, additives such as a preservative, an antioxidant, a coloring agent, and a sweetener is able to also be used as necessary.

In the present embodiment, although the medical tablet is described as an example of the tablet, the present invention is not limited thereto. The printing target of the inkjet ink according to the present embodiment is not particularly limited, and various tablets such as tablets, supplements, and food such as a tablet for administration to animals (pets, livestock, poultry, and the like) other than humans, feed, fertilizer, detergent, and ramune candy may be printed on a surface thereof. In addition, a size of the printing target of the inkjet ink according to the present embodiment is not particularly limited, and the inkjet ink is able to be applied to tablets having various sizes.

Effect of Present Embodiment (1) The inkjet ink according to the present embodiment includes a food dye, an adhesive, and water and ethanol as a solvent, and includes only a liquid adhesive as the adhesive.

With such a configuration, it is possible to improve fixedness (transfer durability) of the ink while maintaining excellent printing stability, as compared with the related art.

(2) In the inkjet ink according to the present embodiment, the adhesive may be polyethylene glycol.

With such a configuration, the inkjet ink is imparted with an appropriate viscosity (fluidity) and affinity (bonding property) with a tablet surface substance is further increased as compared with the related art. Therefore, the ink including the food dye described above is able to be fixed to a surface of a target printed matter. Therefore, the inkjet ink according to the present embodiment is able to further improve visibility of a printing image, and is able to further improve the ink fixedness (transfer durability) of the printing image.

(3) In addition, in the inkjet ink according to the present embodiment, an average molecular weight of polyethylene glycol may be in a range of 280 or more and 420 or less.

With such a configuration, the inkjet ink is imparted with an appropriate viscosity (fluidity) and affinity (bonding property) with a tablet surface substance is further increased as compared with the related art. Therefore, the ink including the food dye described above is able to be fixed to a surface of a target printed matter. Therefore, the inkjet ink according to the present embodiment is able to further improve visibility of a printing image, and is able to further improve the ink fixedness (transfer durability) of the printing image.

(4) In addition, the inkjet ink according to the present embodiment may further include propylene glycol as a wetting agent.

With such a configuration, it is possible to prevent drying of the ink in an inkjet nozzle and impart high printing stability, particularly excellent intermittent resumability to the ink, as compared with the related art.

(5) In addition, in a case where the inkjet ink according to the present embodiment includes the wetting agent, the food dye may be compounded in a range of 1.0% or more and 5.0% or less with respect to a total mass of the inkjet ink for a tablet, the adhesive may be compounded in a range of 1.0% or more and 7.0% or less with respect to the total mass of the inkjet ink for a tablet, and the wetting agent may be compounded in a range of 0% or more and 28.0% or less with respect to the total mass of the inkjet ink for a tablet.

With such a configuration, the inkjet ink is imparted with an appropriate viscosity (fluidity) and affinity (bonding property) with a tablet surface substance is further increased as compared with the related art. Therefore, the ink including the food dye described above is able to be fixed to a surface of a target printed matter. Therefore, the inkjet ink according to the present embodiment is able to further improve visibility of a printing image, and is able to further improve the ink fixedness (transfer durability) of the printing image. In addition, it is possible to prevent the ink from being dried in the inkjet nozzle and to impart high printing stability, particularly excellent intermittent resumability, to the ink.

(6) In addition, in a case where the inkjet ink according to the present embodiment does not include a wetting agent, the dye may be compounded in a range of 1.0% or more and 5.0% or less with respect to the total mass of the inkjet ink for a tablet, and the adhesive may be compounded in a range of 1.0% or more and 7.0% or less with respect to the total mass of the inkjet ink for a tablet.

With such a configuration, the inkjet ink is imparted with an appropriate viscosity (fluidity) and affinity (bonding property) with a tablet surface substance is further increased as compared with the related art. Therefore, the ink including the food dye described above is able to be fixed to a surface of a target printed matter. Therefore, the inkjet ink according to the present embodiment is able to further improve visibility of a printing image, and is able to further improve the ink fixedness (transfer durability) of the printing image.

(7) In addition, the inkjet ink according to the present embodiment may include, as the food dye, at least one selected from an azo-based dye, a triphenylmethane-based dye, or a xanthene-based dye.

With such a configuration, the visibility of the printing image is able to be further improved as compared with the related art.

(8) In addition, in the inkjet ink according to the present embodiment, the azo-based dye may be Red No. 102 or Yellow No. 4, the triphenylmethane-based dye may be Blue No. 1, and the xanthene-based dye may be Red No. 3.

With such a configuration, the visibility of the printing image is able to be further improved as compared with the related art.

(9) The tablet printed matter according to the present embodiment includes the printing image (an example of a printing portion) 3 printed with the inkjet ink described above.

With such a configuration, as compared to the related art, unintended transfer is suppressed, and visibility of the printing image 3 or the like directly printed on the surface of the tablet or the like is able to be sufficiently improved. Further, edibility is able to also be imparted to the printing image portion printed on the surface of the tablet.

EXAMPLES

Hereinafter, the present invention will be described in more detail with reference to Examples, but the present invention is not limited by Examples.

Examples 1 to 33 and Comparative Examples 1 to 12

Hereinafter, preparation procedures of inkjet inks of Examples 1 to 33 and Comparative Examples 1 to 12 will be described.

(Production of Inkjet Ink)

First, a printing ink is prepared. The inkjet ink includes a pigment (food dye), a solvent, an adhesive (coating agent), and a fading inhibitor at contents to be described below. In an order of preparation, first, the adhesive and the fading inhibitor are added to the solvent to obtain a transparent base liquid. Next, the pigment is added to the transparent base liquid. In this manner, the ink according to the present example is prepared. Hereinafter, various components will be specifically described.

In the present example, each of purified water (ion exchange water), propylene glycol (PG), and ethanol is used as the solvent as necessary. Specifically, propylene glycol (PG) and ethanol are added to purified water and stirred well to obtain a solvent (mixed solvent). In addition, the adhesive and the fading inhibitor described above are added to the solvent as necessary, and the mixture is stirred for appropriately 1 hour to obtain a transparent base liquid. Blue No. 1, Red No. 3, Red No. 102, and Yellow No. 4, which are food dyes, as a pigment are added to the transparent base liquid described above as necessary to obtain inkjet inks of Examples 1 to 33 and Comparative Examples 1 to 12.

Sample 1 (Comparative Example 1)

Sample 1 (Comparative Example 1) is prepared such that a compounding ratio of Blue No. 1 as a pigment is set to 1.5 mass %, a compounding ratio of purified water is set to 63.0 mass %, a compounding ratio of ethanol is set to 6.5 mass %, and a compounding ratio of propylene glycol (PG) is set to 28.0 mass % in a solvent, and a compounding ratio of polyvinylpyrrolidone (PVP) (molecular weight: 45,000) as an adhesive is set to 1.0 mass % with respect to the entire inkjet ink. Polyvinylpyrrolidone (PVP) used as the adhesive in this sample is a solid in a temperature range of 0° C. or more and 50° C. or less.

In this manner, an inkjet ink of Sample 1 (Comparative Example 1) is obtained.

Sample 2 (Comparative Example 2)

Sample 2 (Comparative Example 2) is prepared in the same manner as Sample 1 (Comparative Example 1), except that in the adhesive, the compounding ratio of polyvinylpyrrolidone (PVP) (molecular weight: 45,000) is set to 0.5 mass % and the compounding ratio of polyethylene glycol (PEG 400) is set to 0.5 mass % with respect to the entire inkjet ink. Polyethylene glycol (PEG 400) used as the adhesive in this sample is a liquid in a temperature range of 0° C. or more and 50° C. or less.

In this manner, an inkjet ink of Sample 2 (Comparative Example 2) is obtained.

Sample 3 (Comparative Example 3)

Sample 3 is prepared in the same manner as Sample 1 (Comparative Example 1), except that the adhesive was a sodium salt of carboxymethyl cellulose (CMC-Na). The sodium salt of carboxymethyl cellulose (CMC-Na) used as the adhesive in this sample is a solid in a temperature range of 0° C. or more and 50° C. or less.

In this manner, an inkjet ink of Sample 3 (Comparative Example 3) is obtained.

Sample 4 (Comparative Example 4)

Sample 4 (Comparative Example 4) is prepared in the same manner as Sample 1 (Comparative Example 1), except that in the adhesive, the compounding ratio of the sodium salt of carboxymethyl cellulose (CMC-Na) is set to 0.5 mass % and the compounding ratio of polyethylene glycol (PEG 400) is set to 0.5 mass % with respect to the entire inkjet ink.

In this manner, an inkjet ink of Sample 4 (Comparative Example 4) is obtained.

Sample 5 (Comparative Example 5)

Sample 5 (Comparative Example 5) is prepared in the same manner as Sample 1 (Comparative Example 1), except that the compounding ratio of the polyvinyl alcohol-acrylic acid-methyl methacrylate copolymer (POVACOAT) as the adhesive is set to 1.0 mass % with respect to the entire inkjet ink. The polyvinyl alcohol-acrylic acid-methyl methacrylate copolymer (POVACOAT) used as the adhesive in this sample is a solid in a temperature range of 0° C. or more and 50° C. or less.

In this manner, an inkjet ink of Sample 5 (Comparative Example 5) is obtained.

Sample 6 (Example 1)

Sample 6 (Example 1) is prepared in the same manner as Sample 1 (Comparative Example 1), except that the compounding ratio of polyethylene glycol (PEG 400) as the adhesive is set to 1.0 mass % with respect to the entire inkjet ink.

In this manner, an inkjet ink of Sample 6 (Example 1) is obtained.

Sample 7 (Example 2)

Sample 7 (Example 2) is prepared such that the compounding ratio of Blue No. 1 as the pigment is set to 1.5 mass %, the compounding ratio of purified water is set to 48.0 mass %, the compounding ratio of ethanol is set to 11.5 mass %, and the compounding ratio of propylene glycol (PG) is set to 28.0 mass % in the solvent, the compounding ratio of polyethylene glycol (PEG 400) as the adhesive is set to 1.0 mass %, and the compounding ratio of reduced isomaltulose (described as "isomalt" in the table) as the fading inhibitor is set to 10.0 mass % with respect to the entire inkjet ink.

In this manner, an inkjet ink of Sample 7 (Example 2) is obtained.

Sample 8 (Example 3)

Sample 8 (Example 3) is prepared such that the compounding ratio of Blue No. 1 as the pigment is set to 1.5 mass %, the compounding ratio of purified water is set to 50.5 mass %, the compounding ratio of ethanol is set to 11.5 mass %, and the compounding ratio of propylene glycol (PG) is set to 28.0 mass % in the solvent, the compounding ratio of polyethylene glycol (PEG 400) as the adhesive is set to 1.0 mass %, and the compounding ratio of reduced isomaltulose as the fading inhibitor is set to 7.5 mass % with respect to the entire inkjet ink.

In this manner, an inkjet ink of Sample 8 (Example 3) is obtained.

Sample 9 (Example 4)

Sample 9 (Example 4) is prepared such that the compounding ratio of Blue No. 1 as the pigment is set to 1.5 mass %, the compounding ratio of purified water is set to 53.0 mass %, the compounding ratio of ethanol is set to 11.5 mass %, and the compounding ratio of propylene glycol (PG) is set to 28.0 mass % in the solvent, the compounding ratio of polyethylene glycol (PEG 400) as the adhesive is set to 1.0 mass %, and the compounding ratio of reduced isomaltulose as the fading inhibitor is set to 5.0 mass % with respect to the entire inkjet ink.

In this manner, an inkjet ink of Sample 9 (Example 4) is obtained.

Sample 10 (Example 5)

Sample 10 (Example 5) is prepared such that the compounding ratio of Blue No. 1 as the pigment is set to 1.5 mass %, the compounding ratio of purified water is set to 55.5 mass %, the compounding ratio of ethanol is set to 11.5 mass %, and the compounding ratio of propylene glycol (PG) is set to 28.0 mass % in the solvent, the compounding ratio of polyethylene glycol (PEG 400) as the adhesive is set to 1.0 mass %, and the compounding ratio of reduced isomaltulose as the fading inhibitor is set to 2.5 mass % with respect to the entire inkjet ink.

In this manner, an inkjet ink of Sample 10 (Example 5) is obtained.

Sample 11 (Example 6)

Sample 11 (Example 6) is prepared such that the compounding ratio of Blue No. 1 as the pigment is set to 1.5 mass %, the compounding ratio of purified water is set to 58.0 mass %, the compounding ratio of ethanol is set to 11.5 mass %, and the compounding ratio of propylene glycol (PG) is set to 28.0 mass % in the solvent, and the compounding ratio of polyethylene glycol (PEG 400) as the adhesive is set to 1.0 mass % with respect to the entire inkjet ink.

In this manner, an inkjet ink of Sample 11 (Example 6) is obtained.

Sample 12 (Comparative Example 6)

Sample 12 (Comparative Example 6) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 28.0 mass % in the solvent with respect to the entire inkjet ink.

In this manner, an inkjet ink of Sample 12 (Comparative Example 6) is obtained.

Sample 13 (Comparative Example 7)

Sample 13 (Comparative Example 7) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 28.0 mass % in the solvent, and the compounding ratio of reduced isomaltulose as the fading inhibitor is set to 5.0 mass % with respect to the entire inkjet ink.

In this manner, an inkjet ink of Sample 13 (Comparative Example 7) is obtained.

Sample 14 (Example 7)

Sample 14 (Example 7) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 26.6 mass % in the solvent, and the compounding ratio of polyethylene glycol (PEG 400) as the adhesive is set to 1.4 mass % with respect to the entire inkjet ink.

In this manner, an inkjet ink of Sample 14 (Example 7) is obtained.

Sample 15 (Example 8)

Sample 15 (Example 8) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 26.6 mass % in the solvent, the compounding ratio of polyethylene glycol (PEG 400) as the adhesive is set to 1.4 mass %, and the compounding ratio of reduced isomaltulose as the fading inhibitor is set to 5.0 mass % with respect to the entire inkjet ink.

In this manner, an inkjet ink of Sample 15 (Example 8) is obtained.

Sample 16 (Example 9)

Sample 16 (Example 9) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 25.2 mass % in the solvent, and the compounding ratio of polyethylene glycol (PEG 300) as the adhesive is set to 2.8 mass % with respect to the entire inkjet ink. Polyethylene glycol (PEG 300) used as the adhesive in this sample is a liquid in a temperature range of 0° C. or more and 50° C. or less.

In this manner, an inkjet ink of Sample 16 (Example 9) is obtained.

Sample 17 (Example 10)

Sample 17 (Example 10) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 25.2 mass % in the solvent, the compounding ratio of polyethylene glycol (PEG 300) as the adhesive is set to 2.8 mass %, and the compounding ratio of reduced isomaltulose as the fading inhibitor is set to 5.0 mass % with respect to the entire inkjet ink.

In this manner, an inkjet ink of Sample 17 (Example 10) is obtained.

Sample 18 (Example 11)

Sample 18 (Example 11) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 25.2 mass % in the solvent, the compounding ratio of polyethylene glycol (PEG 400) as the adhesive is set to 2.8 mass %, and the compounding ratio of reduced isomaltulose as the fading inhibitor is set to 5.0 mass % with respect to the entire inkjet ink.

In this manner, an inkjet ink of Sample 18 (Example 11) is obtained.

Sample 19 (Example 12)

Sample 19 (Example 12) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 23.8 mass % in the solvent, the compounding ratio of polyethylene glycol (PEG 300) as the adhesive is set to 4.2 mass %, and the compounding ratio of reduced isomaltulose as the fading inhibitor is set to 5.0 mass % with respect to the entire inkjet ink.

In this manner, an inkjet ink of Sample 19 (Example 12) is obtained.

Sample 20 (Example 13)

Sample 20 (Example 13) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 20 (Example 13) is obtained.

Sample 21 (Example 14)

Sample 21 (Example 14) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 21.0 mass % in the solvent, and the compounding ratio of polyethylene glycol (PEG 400) as the adhesive is set to 7.0 mass % with respect to the entire inkjet ink.

In this manner, an inkjet ink of Sample 21 (Example 14) is obtained.

Sample 22 (Example 15)

Sample 22 (Example 15) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 21.0 mass % in the solvent, the compounding ratio of polyethylene glycol (PEG 400) as the adhesive is set to 7.0 mass %, and the compounding ratio of reduced isomaltulose as the fading inhibitor is set to 5.0 mass % with respect to the entire inkjet ink.

In this manner, an inkjet ink of Sample 22 (Example 15) is obtained.

Sample 23 (Example 16)

Sample 23 (Example 16) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 14.0 mass % in the solvent, and the compounding ratio of polyethylene glycol (PEG 400) as the adhesive is set to 14.0 mass % with respect to the entire inkjet ink.

In this manner, an inkjet ink of Sample 23 (Example 16) is obtained.

Sample 24 (Example 17)

Sample 24 (Example 17) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 14.0 mass % in the solvent, the compounding ratio of polyethylene glycol (PEG 400) as the adhesive is set to 14.0 mass %, and the compounding ratio of reduced isomaltulose as the fading inhibitor is set to 5.0 mass % with respect to the entire inkjet ink.

In this manner, an inkjet ink of Sample 24 (Example 17) is obtained.

Sample 25 (Comparative Example 8)

Sample 25 (Comparative Example 8) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 23.8 mass % in the solvent, and the compounding ratio of polyethylene glycol (PEG 4000) as the adhesive is set to 4.2 mass % with respect to the entire inkjet ink. Polyethylene glycol (PEG 4000) used as the adhesive in this sample is a solid in a temperature range of 0° C. or more and 50° C. or less.

In this manner, an inkjet ink of Sample 25 (Comparative Example 8) is obtained.

Sample 26 (Comparative Example 9)

Sample 26 (Comparative Example 9) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 23.8 mass % in the solvent, and the compounding ratio of polyethylene glycol (PEG 1540) as the adhesive is set to 4.2 mass % with respect to the entire inkjet ink. Polyethylene glycol (PEG 1540) used as the adhesive in this sample is a solid in a temperature range of 0° C. or more and 50° C. or less.

In this manner, an inkjet ink of Sample 26 (Comparative Example 9) is obtained.

Sample 27 (Example 18)

Sample 27 (Example 18) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 23.8 mass % in the solvent, and the compounding ratio of polyethylene glycol (PEG 400) as the adhesive is set to 4.2 mass % with respect to the entire inkjet ink.

In this manner, an inkjet ink of Sample 27 (Example 18) is obtained.

Sample 28 (Example 19)

Sample 28 (Example 19) is prepared such that the compounding ratio of Blue No. 1 as the pigment is set to 1.5 mass %, the compounding ratio of purified water is set to 64.0 mass %, the compounding ratio of ethanol is set to 6.5 mass %, and the compounding ratio of propylene glycol (PG) is set to 23.8 mass % in the solvent, and the compounding ratio of polyethylene glycol (PEG 300) as the adhesive is set to 4.2 mass % with respect to the entire inkjet ink.

In this manner, an inkjet ink of Sample 28 (Example 19) is obtained.

Sample 29 (Example 20)

Sample 29 (Example 20) is prepared such that the compounding ratio of Blue No. 1 as the pigment is set to 0.5 mass %, the compounding ratio of purified water is set to 60.0 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 29 (Example 20) is obtained.

Sample 30 (Example 21)

Sample 30 (Example 21) is prepared such that the compounding ratio of Blue No. 1 as the pigment is set to 1.0 mass %, the compounding ratio of purified water is set to 59.5 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 30 (Example 21) is obtained.

Sample 31 (Example 22)

Sample 31 (Example 22) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 31 (Example 22) is obtained.

Sample 32 (Example 23)

Sample 32 (Example 23) is prepared such that the compounding ratio of Blue No. 1 as the pigment is set to 3.0 mass %, the compounding ratio of purified water is set to 57.5 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 32 (Example 23) is obtained.

Sample 33 (Example 24)

Sample 33 (Example 24) is prepared such that the compounding ratio of Blue No. 1 as the pigment is set to 4.0 mass %, the compounding ratio of purified water is set to 56.5 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 33 (Example 24) is obtained.

Sample 34 (Example 25)

Sample 34 (Example 25) is prepared such that the compounding ratio of Blue No. 1 as the pigment is set to 5.0 mass %, the compounding ratio of purified water is set to 55.5 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 34 (Example 25) is obtained.

Sample 35 (Example 26)

Sample 35 (Example 26) is prepared such that the compounding ratio of Blue No. 1 as the pigment is set to 6.0 mass %, the compounding ratio of purified water is set to 54.5 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 35 (Example 26) is obtained.

Sample 36 (Comparative Example 10)

Sample 36 (Comparative Example 10) is prepared such that the compounding ratio of Blue No. 1 is set to 0.04 mass % and the compounding ratio of Red No. 3 is set to 2.5 mass % in the pigment, the compounding ratio of purified water is set to 57.3 mass %, the compounding ratio of ethanol is set to 6.5 mass %, and the compounding ratio of propylene glycol (PG) is set to 28.0 mass % in the solvent, and the compounding ratio of tripotassium citrate (described as "K citrate" in the table) is set to 5.0 mass % and the compounding ratio of reduced isomaltulose is set to 0.7 mass % in the fading inhibitor, with respect to the entire inkjet ink.

In this manner, an inkjet ink of Sample 36 (Comparative Example 10) is obtained.

Sample 37 (Comparative Example 11)

Sample 37 (Comparative Example 11) is prepared such that the compounding ratio of Blue No. 1 is set to 0.7 mass %, the compounding ratio of Red No. 102 is set to 1.4 mass %, and the compounding ratio of Yellow No. 4 is set to 0.4 mass % in the pigment, the compounding ratio of purified water is set to 53.0 mass %, the compounding ratio of ethanol is set to 11.5 mass %, and the compounding ratio of propylene glycol (PG) is set to 28.0 mass % in the solvent, and the compounding ratio of reduced isomaltulose as the fading inhibitor is set to 5.0 mass %, with respect to the entire inkjet ink.

In this manner, an inkjet ink of Sample 37 (Comparative Example 11) is obtained.

Sample 38 (Example 27)

Sample 38 (Example 27) is prepared such that the compounding ratio of Blue No. 1 is set to 0.04 mass % and the compounding ratio of Red No. 3 is set to 2.5 mass % in the pigment, the compounding ratio of purified water is set to 57.3 mass %, the compounding ratio of ethanol is set to 6.5 mass %, and the compounding ratio of propylene glycol (PG) is set to 25.2 mass % in the solvent, the compounding ratio of polyethylene glycol (PEG 400) as the adhesive is set to 2.8 mass %, the compounding ratio of tripotassium citrate in the fading inhibitor is set to 5.0 mass %, and the compounding ratio of reduced isomaltulose as the fading inhibitor is set to 0.7 mass %, with respect to the entire inkjet ink.

In this manner, an inkjet ink of Sample 38 (Example 27) is obtained.

Sample 39 (Example 28)

Sample 39 (Example 28) is prepared such that the compounding ratio of Blue No. 1 is set to 0.04 mass % and the compounding ratio of Red No. 3 is set to 2.5 mass % in the pigment, the compounding ratio of purified water is set to 57.3 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of tripotassium citrate is set to 5.0 mass % and the compounding ratio of reduced isomaltulose is set to 0.7 mass % in the fading inhibitor, with respect to the entire inkjet ink.

In this manner, an inkjet ink of Sample 39 (Example 28) is obtained.

Sample 40 (Example 29)

Sample 40 (Example 29) is prepared such that the compounding ratio of Blue No. 1 is set to 0.7 mass %, the compounding ratio of Red No. 102 is set to 1.4 mass %, and the compounding ratio of Yellow No. 4 is set to 0.4 mass % in the pigment, the compounding ratio of purified water is set to 53.0 mass %, the compounding ratio of ethanol is set to 11.5 mass %, and the compounding ratio of propylene glycol (PG) is set to 25.2 mass % in the solvent, the compounding ratio of polyethylene glycol (PEG 400) as the adhesive is set to 2.8 mass %, and the compounding ratio of reduced isomaltulose as the fading inhibitor is set to 5.0 mass %, with respect to the entire inkjet ink.

In this manner, an inkjet ink of Sample 40 (Example 29) is obtained.

Sample 41 (Example 30)

Sample 41 (Example 30) is prepared such that the compounding ratio of Blue No. 1 is set to 0.7 mass %, the compounding ratio of Red No. 102 is set to 1.4 mass %, and the compounding ratio of Yellow No. 4 is set to 0.4 mass % in the pigment, the compounding ratio of purified water is set to 53.0 mass %, the compounding ratio of ethanol is set to 11.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass %, with respect to the entire inkjet ink.

In this manner, an inkjet ink of Sample 41 (Example 30) is obtained.

Sample 42 (Comparative Example 12)

Sample 42 (Comparative Example 12) is prepared such that the compounding ratio of Blue No. 1 as the pigment is set to 1.5 mass %, the compounding ratio of purified water is set to 65.5 mass % and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass %, with respect to the entire inkjet ink.

In this manner, an inkjet ink of Sample 42 (Comparative Example 12) is obtained.

Sample 43 (Example 31)

Sample 43 (Example 31) is prepared such that the compounding ratio of Blue No. 1 as the pigment is set to 1.5 mass %, the compounding ratio of purified water is set to 59.0 mass %, the compounding ratio of ethanol is set to 6.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 43 (Example 31) is obtained.

Sample 44 (Example 32)

Sample 44 (Example 32) is prepared such that the compounding ratio of Blue No. 1 as the pigment is set to 1.5 mass %, the compounding ratio of purified water is set to 54.0 mass %, the compounding ratio of ethanol is set to 11.5 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 44 (Example 32) is obtained.

Sample 45 (Example 33)

Sample 45 (Example 33) is prepared such that the compounding ratio of Blue No. 1 as the pigment is set to 1.5 mass %, the compounding ratio of purified water is set to 45.5 mass %, the compounding ratio of ethanol is set to 20.0 mass %, and the compounding ratio of propylene glycol (PG) is set to 23.8 mass % in the solvent, the compounding ratio of polyethylene glycol (PEG 400) as the adhesive is set to 4.2 mass %, and the compounding ratio of reduced isomaltulose as the fading inhibitor is set to 5.0 mass % with respect to the entire inkjet ink.

In this manner, an inkjet ink of Sample 45 (Example 33) is obtained.

Each of the inks of Examples 1 to 33 and Comparative Examples 1 to 12 described above is passed through a membrane filter to remove a solid foreign substance in the liquid. Specifically, the ink is passed through a membrane filter (cellulose acetate membrane) having a pore size of 5.0 μm once, and then is passed through a membrane filter (cellulose acetate membrane) having a pore size of 0.8 μm once, thereby obtaining each of the purified inks.

<Evaluation>

Printing stability and transferability (transfer durability) of the purified ink obtained by the ink of each of Examples and Comparative examples described above are evaluated by the following method. The evaluation results are shown in Tables 1 to 4 to be described below, together with the ink compositions of each of Examples and Comparative Examples described above.

(Printing Stability: Initial Printability and Continuous Printability)

A drop-on-demand type inkjet head driven by piezoelectric ceramics having a printing resolution of 600 dpi in a main scanning direction, 600 dpi in a sub-scanning direction (transport direction of a recording medium such as a tablet), and a total number of nozzles of 2,656 is used as the inkjet head. By using the inkjet head described above, a test pattern is printed immediately after nozzle maintenance is executed. Then, from a printing state of the test pattern, readability of a text printing image associated with occurrence of a discharge failure region is checked. The evaluation standards are as follows.

The "initial printability" in the present evaluation is printability immediately after a start of printing, and the "continuous printability" is printability when the test pattern is printed after continuously discharging the ink from the head for 30 minutes.

Good: A case where omission or bending of line is 5% or less of entire line

Average: A case where omission or bending of line is 20% or less of entire line

Poor: A case where omission or bending of line is more than 20% of entire line

In a case where each of the evaluations of the initial printability and the continuous printability is "Good" or "Average", the inks were used without any problem, and therefore evaluated as "Pass".

(Printing Stability: Intermittent Resumability)

By using a drop-on-demand type inkjet head driven by piezoelectric ceramics having a printing resolution of 600 dpi in the main scanning direction, 600 dpi in the sub-scanning direction (transport direction of a recording medium such as a tablet), and a total number of nozzles of 1,280, a test pattern is printed with a printing drop amount of 6 pl per drop after being left without flushing for a specified time (15 minutes to 60 minutes), and it is checked that the ink is able to be discharged from all the nozzles without a discharge failure amount. In Tables 1 to 4 below, as the evaluation results of intermittent printability (intermittent resumability and discharge stability), a time during which the ink is able to be discharged is measured. The evaluation standards are as follows.

Good: 30 minutes or more

Average: 20 minutes or more and less than 30 minutes

Poor: less than 20 minutes

When evaluation of intermittent resumability (discharge stability) test is "Good" or "Average", the inks were used without any problem, and therefore evaluated as "Pass".

(Transferability: Pressing Test)

By using a drop-on-demand type inkjet head driven by piezoelectric ceramics having a printing resolution of 600 dpi in the main scanning direction, 600 dpi in the sub-scanning direction (transport direction of a recording medium such as a tablet), and a total number of nozzles of 1,280, an image is printed on a tablet to be described above with each of the inkjet inks of Examples and Comparative Examples, with a printing drop amount of 6 pl per drop.

The printed image is dried with warm air for 5 seconds while 60 seconds passes after printing, and a pressing test is executed at a point in time when 60 seconds passes after printing. In the present pressing test, the printed tablet is brought into contact with a tablet attached to a digital force gauge at a pressure of 9 to 10 N for 0.9 to 1.0 seconds, and it is checked that the printed ink is not transferred. In Tables 1 to 4, a concentration of the transferred ink is visually observed as an evaluation result of transfer durability (drying properties). The evaluation standards are as follows.

Excellent: A case where ink is not transferred

Good: A case where transfer of ink is extremely slight and it is difficult to visually check transfer Average: A case where transfer of ink is slight and it is possible (easy) to visually check transfer Poor: A case where ink is transferred in darker color In a case where the evaluation of the transferability (the transfer durability) is "Excellent", "Good", or "Average", the inks were used without any problem, and therefore evaluated as "Pass".

The compositions and evaluation results of the inkjet ink of each of Examples and Comparative Examples are shown in Tables 1 to 4. In Tables 1 to 4, the "blank" portion indicates that the substance is not used. In addition, units in Tables 1 to 4 are all "mass %".

TABLE 1

| | | | Comp. Ex. 1 to 5 | | | | | Ex. 1 | Ex. 2 to 6 | | | | |
|---|---|---|---|---|---|---|---|---|---|---|---|---|---|
| | | | #1 | #2 | #3 | #4 | #5 | #6 | #7 | #8 | #9 | #10 | #11 |
| Formula | Pigment | Blue No. 1 | 1.5% | 1.5% | 1.5% | 1.5% | 1.5% | 1.5% | 1.5% | 1.5% | 1.5% | 1.5% | 1.5% |
| | | Red No. 3 | | | | | | | | | | | |
| | | Red No. 102 | | | | | | | | | | | |
| | | Yellow No. 4 | | | | | | | | | | | |
| | Solvent | Water | 63.0% | 63.0% | 63.0% | 63.0% | 63.0% | 63.0% | 48.0% | 50.5% | 53.0% | 55.5% | 58.0% |
| | | Ethanol | 6.5% | 6.5% | 6.5% | 6.5% | 6.5% | 6.5% | 11.5% | 11.5% | 11.5% | 11.5% | 11.5% |
| | | PG | 28.0% | 28.0% | 28.0% | 28.0% | 28.0% | 28.0% | 28.0% | 28.0% | 28.0% | 28.0% | 28.0% |
| | Coating agent | PVP (45,000) | 1.0% | 0.5% | | | | | | | | | |
| | | CMC-Na | | | 1.0% | 0.5% | | | | | | | |
| | Adhesive | POVACOAT | | | | | 1.0% | | | | | | |
| | | PEG 400 | | 0.5% | | 0.5% | | 1.0% | 1.0% | 1.0% | 1.0% | 1.0% | 1.0% |
| | Fading inhibitor | Isomalt | | | | | | | 10.0% | 7.5% | 5.0% | 2.5% | |
| Printability | Initial print | | Good | Good | Good | Good | Good | Good | Good | Good | Good | Good | Good |
| | Continuous print | | Good | Good | Good | Good | Good | Good | Good | Good | Good | Good | Good |
| | Intermittent resumability: 30 min | | Poor | Poor | Poor | Poor | Poor | Good | Average | Good | Good | Good | Good |
| Transfer-ability | Press test [warm air drying] | | Average | Good | Good | Good | Average | Good | Average | Average | Good | Good | Good |

TABLE 2

| | | | Comp. Ex. 6 and 7 | | Ex. 7 to 17 | | | | |
|---|---|---|---|---|---|---|---|---|---|
| | | | #12 | #13 | #14 | #15 | #16 | #17 | #18 |
| Formula | Pigment | Blue No. 1 | 1.5% | 1.5% | 1.5% | 1.5% | 1.5% | 1.5% | 1.5% |
| | | Red No. 3 | | | | | | | |
| | | Red No. 102 | | | | | | | |
| | | Yellow No. 4 | | | | | | | |
| | Solvent | Water | 64.0% | 59.0% | 64.0% | 59.0% | 64.0% | 59.0% | 59.0% |
| | | Ethanol | 6.5% | 6.5% | 6.5% | 6.5% | 6.5% | 6.5% | 6.5% |
| | | PG | 28.0% | 28.0% | 26.6% | 26.6% | 25.2% | 25.2% | 25.2% |
| | Adhesive | PEG 300 | | | | | 2.8% | 2.8% | |
| | | PEG 400 | | | 1.4% | 1.4% | | | 2.8% |
| | Fading inhibitor | Isomalt | | 5.0% | | 5.0% | | 5.0% | 5.0% |
| Printability | Initial print | | Good | Good | Good | Good | Good | Good | Good |
| | Continuous print | | Good | Good | Good | Good | Good | Good | Good |
| | Intermittent resumability: 30 min | | Good | Good | Good | Good | Good | Good | Good |
| Transferability | Press test [warm air drying] | | Poor | Poor | Good | Good | Excellent | Excellent | Excellent |

| | | | Ex. 7 to 17 | | | | | |
|---|---|---|---|---|---|---|---|---|
| | | | #19 | #20 | #21 | #22 | #23 | #24 |
| Formula | Pigment | Blue No. 1 | 1.5% | 1.5% | 1.5% | 1.5% | 1.5% | 1.5% |
| | | Red No. 3 | | | | | | |
| | | Red No. 102 | | | | | | |
| | | Yellow No. 4 | | | | | | |
| | Solvent | Water | 59.0% | 59.0% | 64.0% | 59.0% | 64.0% | 59.0% |
| | | Ethanol | 6.5% | 6.5% | 6.5% | 6.5% | 6.5% | 6.5% |
| | | PG | 23.8% | 23.8% | 21.0% | 21.0% | 14.0% | 14.0% |
| | Adhesive | PEG 300 | 4.2% | | | | | |
| | | PEG 400 | | 4.2% | 7.0% | 7.0% | 14.0% | 14.0% |
| | Fading inhibitor | Isomalt | 5.0% | 5.0% | | 5.0% | | 5.0% |
| Printability | Initial print | | Good | Good | Good | Good | Average | Average |
| | Continuous print | | Good | Good | Good | Good | Average | Average |
| | Intermittent resumability: 30 min | | Good | Good | Good | Good | Average | Average |
| Transferability | Press test [warm air drying] | | Excellent | Excellent | Average | Average | Average | Average |

TABLE 3

| | | | Comp. Ex. 8 and 9 | | Ex. 18 to 19 | | Ex. 20 to 26 | |
|---|---|---|---|---|---|---|---|---|
| | | | #25 | #26 | #27 | #28 | #29 | #30 |
| Formula | Pigment | Blue No. 1 | 1.5% | 1.5% | 1.5% | 1.5% | 0.5% | 1.0% |
| | | Red No. 3 | | | | | | |
| | | Red No. 102 | | | | | | |
| | | Yellow No. 4 | | | | | | |
| | Solvent | Water | 64.0% | 64.0% | 64.0% | 64.0% | 60.0% | 59.5% |
| | | Ethanol | 6.5% | 6.5% | 6.5% | 6.5% | 6.5% | 6.5% |
| | | PG | 23.8% | 23.8% | 23.8% | 23.8% | 23.8% | 23.8% |
| | Adhesive | PEG 300 | | | | 4.2% | | |
| | | PEG 400 | | | 4.2% | | 4.2% | 4.2% |
| | | PEG 1540 | | 4.2% | | | | |
| | | PEG 4000 | 4.2% | | | | | |
| | Fading inhibitor | Isomalt | | | | | 5.0% | 5.0% |
| Printability | Initial print | | Good | Good | Good | Good | Good | Good |
| | Continuous print | | Good | Good | Good | Good | Good | Good |
| | Intermittent resumability: 30 min | | Poor | Poor | Good | Good | Good | Good |
| Transferability | Press test [warm air drying] | | Good | Good | Excellent | Excellent | Excellent | Excellent |

TABLE 3-continued

| | | | Ex. 20 to 26 | | | | |
|---|---|---|---|---|---|---|---|
| | | | #31 | #32 | #33 | #34 | #35 |
| Formula | Pigment | Blue No. 1 | 1.5% | 3.0% | 4.0% | 5.0% | 6.0% |
| | | Red No. 3 | | | | | |
| | | Red No. 102 | | | | | |
| | | Yellow No. 4 | | | | | |
| | Solvent | Water | 59.0% | 57.5% | 56.5% | 55.5% | 54.5% |
| | | Ethanol | 6.5% | 6.5% | 6.5% | 6.5% | 6.5% |
| | | PG | 23.8% | 23.8% | 23.8% | 23.8% | 23.8% |
| | Adhesive | PEG 300 | | | | | |
| | | PEG 400 | 4.2% | 4.2% | 4.2% | 4.2% | 4.2% |
| | | PEG 1540 | | | | | |
| | | PEG 4000 | | | | | |
| | Fading inhibitor | Isomalt | 5.0% | 5.0% | 5.0% | 5.0% | 5.0% |
| Printability | Initial print | | Good | Good | Good | Good | Average |
| | Continuous print | | Good | Good | Good | Good | Average |
| | Intermittent resumability: 30 min | | Good | Good | Good | Average | Average |
| Transferability | Press test [warm air drying] | | Excellent | Excellent | Good | Good | Average |

TABLE 4

| | | | Comp. Ex. 10 and 11 | | Ex. 27 to 30 | | | | Comp. Ex. 12 | Ex. 31 to 33 | | |
|---|---|---|---|---|---|---|---|---|---|---|---|---|
| | | | #36 | #37 | #38 | #39 | #40 | #41 | #42 | #43 | #44 | #45 |
| Formula | Pigment | Blue No. 1 | 0.04% | 0.7% | 0.04% | 0.04% | 0.7% | 0.7% | 1.5% | 1.5% | 1.5% | 1.5% |
| | | Red No. 3 | 2.5% | | 2.5% | 2.5% | | | | | | |
| | | Red No. 102 | | 1.4% | | | 1.4% | 1.4% | | | | |
| | | Yellow No. 4 | | 0.4% | | | 0.4% | 0.4% | | | | |
| | Solvent | Water | 57.3% | 53.0% | 57.3% | 57.3% | 53.0% | 53.0% | 65.5% | 59.0% | 54.0% | 45.5% |
| | | Ethanol | 6.5% | 11.5% | 6.5% | 6.5% | 11.5% | 11.5% | | 6.5% | 11.5% | 20.0% |
| | | PG | 28.0% | 28.0% | 25.2% | 23.8% | 25.2% | 23.8% | 23.8% | 23.8% | 23.8% | 23.8% |
| | Adhesive | PEG 400 | | | 2.8% | 4.2% | 2.8% | 4.2% | 4.2% | 4.2% | 4.2% | 4.2% |
| | Fading inhibitor | K citrate | 5.0% | | 5.0% | 5.0% | | | | | | |
| | | Isomalt | 0.7% | 5.0% | 0.7% | 0.7% | 5.0% | 5.0% | 5.0% | 5.0% | 5.0% | 5.0% |
| Printability | Initial print | | Good | Good | Good | Good | Good | Good | Good | Good | Good | Average |
| | Continuous print | | Good | Good | Good | Good | Good | Good | Good | Good | Good | Average |
| | Intermittent resumability: 30 min | | Good | Good | Good | Good | Good | Good | Good | Good | Good | Average |
| Transferability | Press test [warm air drying] | | Poor | Poor | Excellent | Excellent | Excellent | Excellent | Poor | Excellent | Excellent | Excellent |

As shown in Tables 1 to 4, it is found that in the inkjet inks of Examples 1 to 33, the evaluation results of printing stability (initial printability, continuous printability, and intermittent resumability) are all "Average" or more, and thus the inkjet inks had sufficient printing stability (initial printability, continuous printability, and intermittent resumability).

In addition, as shown in Tables 1 to 4, it is found that the evaluation results of transferability (tablet drying properties) of the inkjet inks of Examples 1 to 33 are all "Average" or more, and thus the inkjet inks had sufficient transferability (tablet drying properties).

As described above, with the inkjet ink for a tablet, which includes a food dye, an adhesive, and water and ethanol as solvents, in which only an adhesive having a viscosity of 1,000 mPa·s or less in a temperature range of 0° C. or more and 50° C. or less is added as the adhesive, it is possible to provide an inkjet ink having high printing stability and high ink fixedness (transfer durability) and a tablet printed matter including a printing portion printed with the inkjet ink.

The scope of the present invention is not limited to the exemplary embodiments illustrated and described, and includes all embodiments that provide an effect equivalent to the object of the present invention. Further, the scope of the present invention is not limited to the combination of the features of the invention defined by the claims, and may be defined by any desired combination of specific features in each of all the disclosed features.

In addition, for example, the present invention is able to adopt the following configuration.

(1)

An inkjet ink for a tablet including:

an edible dye; an adhesive; and water and ethanol as a solvent; and only a liquid adhesive as the adhesive.

(2)

The inkjet ink for a tablet according to (1) described above, in which the adhesive is polyethylene glycol.

(3)

The inkjet ink for a tablet according to (2) described above, in which an average molecular weight of the polyethylene glycol is in a range of 280 or more and 420 or less.

(4)

The inkjet ink for a tablet according to any one of (1) to (3) described above, further including: propylene glycol as a wetting agent.

(5)

The inkjet ink for a tablet according to any one of (1) to (3) described above, further including: propylene glycol as a wetting agent; and only one type of polyethylene glycol being the liquid adhesive as the adhesive.

(6)

The inkjet ink for a tablet according to (5) described above, in which

- an average molecular weight of the polyethylene glycol is in a range of 280 or more and 420 or less,
- the polyethylene glycol is compounded in a range of 1.0% or more and 14.0% or less with respect to a total mass of the inkjet ink for a tablet,
- the ethanol is compounded in a range of 6.5% or more and 20.0% or less with respect to the total mass of the inkjet ink for a tablet,
- the dye is at least one type selected from a triphenylmethane-based dye and a xanthene-based dye, and does not include an azo-based dye,
- in a case where the triphenylmethane-based dye is Blue No. 1, the inkjet ink for a tablet further includes reduced isomaltulose as a fading inhibitor, and
- in a case where the xanthene-based dye is Red No. 3, the inkjet ink for a tablet further includes tripotassium citrate as the fading inhibitor.

(7)

The inkjet ink for a tablet according to (6) described above, in which only the edible dye, the adhesive, water and ethanol as the solvent, and the wetting agent are included.

(8)

The inkjet ink for a tablet according to any one of (4) to (7) described above, in which

- the dye is compounded in a range of 1.0% or more and 5.0% or less with respect to the total mass of the inkjet ink for a tablet,
- the adhesive is compounded in a range of 1.0% or more and 7.0% or less with respect to the total mass of the inkjet ink for a tablet, and
- the wetting agent is compounded in a range of more than 0% and 28.0% or less with respect to the total mass of the inkjet ink for a tablet.

(9)

The inkjet ink for a tablet according to any one of (1) to (8) described above, in which

- the dye is compounded in a range of 1.0% or more and 5.0% or less with respect to the total mass of the inkjet ink for a tablet, and
- the adhesive is compounded in a range of 1.0% or more and 7.0% or less with respect to the total mass of the inkjet ink for a tablet.

(10)

The inkjet ink for a tablet according to any one of (1) to (9) described above, in which the dye is at least one type selected from an azo-based dye, a triphenylmethane-based dye, and a xanthene-based dye.

(11)

The inkjet ink for a tablet according to (10) described above, in which

- the azo-based dye is Red No. 102 or Yellow No. 4, the triphenylmethane-based dye is Blue No. 1, and
- the xanthene-based dye is Red No. 3.

(12)

The inkjet ink for a tablet according to any one of (5) to (7) described above, in which

- the polyethylene glycol is compounded in a range of 1.0% or more and 14.0% or less with respect to the total mass of the inkjet ink for a tablet, and
- the propylene glycol is compounded in a range of 14.0% or more and 28.0% or less with respect to the total mass of the inkjet ink for a tablet.

(13)

The inkjet ink for a tablet according to any one of (1) to (12) described above, in which

- the dye is at least one type selected from a triphenylmethane-based dye and a xanthene-based dye, and is not an azo-based dye,
- in a case where the triphenylmethane-based dye is Blue No. 1, the inkjet ink for a tablet further includes reduced isomaltulose as the fading inhibitor, and
- in a case where the xanthene-based dye is Red No. 3, the inkjet ink for a tablet further includes tripotassium citrate as the fading inhibitor.

(14)

The inkjet ink for a tablet according to (13) described above, in which the reduced isomaltulose is compounded in a range of 0.7% or more and 10.0% or less with respect to the total mass of the inkjet ink for a tablet.

(15)

The inkjet ink for a tablet according to any one of (5) to (7) described above, in which

- only the edible dye, the adhesive, water and ethanol as the solvent, the wetting agent, and the fading inhibitor are included,
- the dye is compounded in a range of 1.0% or more and 5.0% or less with respect to the total mass of the inkjet ink for a tablet,
- the polyethylene glycol is compounded in a range of 1.0% or more and 7.0% or less with respect to the total mass of the inkjet ink for a tablet,
- the propylene glycol is compounded in a range of 14.0% or more and 28.0% or less with respect to the total mass of the inkjet ink for a tablet,
- only Blue No. 1 and Red No. 3 are included as the dye,
- reduced isomaltulose is included as the fading inhibitor of Blue No. 1,
- tripotassium citrate is included as the fading inhibitor of Red No. 3, and
- the reduced isomaltulose is compounded in a range of 0.7% or more and 10.0% or less with respect to the total mass of the inkjet ink for a tablet.

(16)

The inkjet ink for a tablet according to any one of (5) to (7) described above, in which

- a content of the polyethylene glycol is less than a content of the propylene glycol, or the content of the polyethylene glycol is the same as the content of the propylene glycol.

(17)

The inkjet ink for a tablet according to (14) described above, in which

- a content of the Blue No. 1 is less than a content of the Red No. 3, and
- a content of the reduced isomaltulose is less than a content of the tripotassium citrate.

(18)

A tablet printed matter including: a printing portion printed by using the inkjet ink for a tablet according to any one of (1) to (17) described above.

REFERENCE SIGNS LIST

1: tablet base material
3: printing image
5: uncoated tablet printed matter
7: film coating layer
9: film-coated tablet printed matter
11: uncoated tablet printing image (solid image)
13: film-coated tablet printing image (two-dimensional barcode)

The invention claimed is:

1. An inkjet ink for a tablet comprising:
an edible dye; an adhesive; and water and ethanol as a solvent,
wherein the inkjet ink for a tablet comprises only a liquid adhesive as the adhesive,
the edible dye does not include an azo-based dye, and
the adhesive is compounded in a range of 1.0% or more and 7.0% or less with respect to a total mass of the inkjet ink for a tablet.

2. The inkjet ink for a tablet according to claim 1,
wherein the adhesive is polyethylene glycol.

3. The inkjet ink for a tablet according to claim 2,
wherein an average molecular weight of the polyethylene glycol is in a range of 280 or more and 420 or less.

4. The inkjet ink for a tablet according to claim 2, further comprising:
propylene glycol as a wetting agent.

5. The inkjet ink for a tablet according to claim 1, further comprising:
propylene glycol as a wetting agent,
wherein the inkjet ink for a tablet comprises only one type of polyethylene glycol being the liquid adhesive as the adhesive,
an average molecular weight of the polyethylene glycol is in a range of 280 or more and 420 or less,
the polyethylene glycol is compounded in a range of 1.0% or more and 14.0% or less with respect to a total mass of the inkjet ink for a tablet,
the ethanol is compounded in a range of 6.5% or more and 20.0% or less with respect to the total mass of the inkjet ink for a tablet,
the dye is at least one type selected from a triphenylmethane-based dye and a xanthene-based dye,
in a case where the triphenylmethane-based dye is Blue No. 1, the inkjet ink for a tablet further comprises reduced isomaltulose as a fading inhibitor, and
in a case where the xanthene-based dye is Red No. 3, the inkjet ink for a tablet further comprises tripotassium citrate as the fading inhibitor.

6. The inkjet ink for a tablet according to claim 5,
wherein only the edible dye, the adhesive, water and ethanol as the solvent, and the wetting agent are included.

7. The inkjet ink for a tablet according to claim 5,
wherein the dye is compounded in a range of 1.0% or more and 5.0% or less with respect to the total mass of the inkjet ink for a tablet,
and
the wetting agent is compounded in a range of more than 0% and 28.0% or less with respect to the total mass of the inkjet ink for a tablet.

8. The inkjet ink for a tablet according to claim 5,
wherein the dye is compounded in a range of 1.0% or more and 5.0% or less with respect to the total mass of the inkjet ink for a tablet.

9. The inkjet ink for a tablet according to claim 4,
wherein the dye is at least one type selected from a triphenylmethane-based dye and a xanthene-based dye.

10. The inkjet ink for a tablet according to claim 9, wherein
the triphenylmethane-based dye is Blue No. 1, and
the xanthene-based dye is Red No. 3.

11. The inkjet ink for a tablet according to claim 5,
wherein the polyethylene glycol is compounded in a range of 1.0% or more and 14.0% or less with respect to the total mass of the inkjet ink for a tablet, and
the propylene glycol is compounded in a range of 14,0% or more and 28.0% or less with respect to the total mass of the inkjet ink for a tablet.

12. The inkjet ink for a tablet according to claim 5,
wherein the dye is at least one type selected from a triphenylmethane-based dye and a xanthene-based dye,
in a case where the triphenylmethane-based dye is Blue No. 1, the inkjet ink for a tablet further comprises reduced isomaltulose as the fading inhibitor, and
in a case where the xanthene-based dye is Red No. 3, the inkjet ink for a tablet further comprises tripotassium citrate as the fading inhibitor.

13. The inkjet ink for a tablet according to claim 12,
wherein the reduced isomaltulose is compounded in a range of 0.7% or more and 10.0% or less with respect to the total mass of the inkjet ink for a tablet.

14. The inkjet ink for a tablet according to claim 5,
wherein only the edible dye, the adhesive, water and ethanol as the solvent, the wetting agent, and the fading inhibitor are included,
the dye is compounded in a range of 1.0% or more and 5.0% or less with respect to the total mass of the inkjet ink for a tablet,
the polyethylene glycol is compounded in a range of 1.0% or more and 7.0% or less with respect to the total mass of the inkjet ink for a tablet,
the propylene glycol is compounded in a range of 14,0% or more and 28.0% or less with respect to the total mass of the inkjet ink for a tablet,
only Blue No. 1 and Red No. 3 are included as the dye,
reduced isomaltulose is included as the fading inhibitor of Blue No. 1,
tripotassium citrate is included as the fading inhibitor of Red No. 3, and
the reduced isomaltulose is compounded in a range of 0.7% or more and 10.0% or less with respect to the total mass of the inkjet ink for a tablet.

15. A tablet printed matter comprising:
a printing portion printed by using the inkjet ink for a tablet according to claim 5.

16. The inkjet ink for a tablet according to claim 3, further comprising:
propylene glycol as a wetting agent.

* * * * *